Patented Apr. 28, 1936

2,038,939

UNITED STATES PATENT OFFICE 2,038,939

METHOD OF MAKING PRUNE BEER

Eberhard A. Klepper, Paicines, Calif.

No Drawing. Application October 13, 1933, Serial No. 693,477

4 Claims. (Cl. 99—43)

My invention relates to making a fermented beverage utilizing prunes as a base.

An object of my invention is to devise a method for making a potable beverage from prunes or comparable fruit.

Another object of my invention is to provide a method of making beer from prunes, which will retain all of the valuable and healthful constituents of prunes in the ultimate product.

A further object of my invention is to provide a method of making prune beer such that the product will be of an attractive and salable quality and appearance.

Other objects will appear in the following description of a preferred form of my method.

While the method of making prune beer of my invention is subject to some variation, dependent, for instance, upon the character of the water used in the process, and is subject to some slight variation to adjust the characteristics of the ultimate product in accordance with the desires of the brewer, the process is in general well represented by the following typical procedure.

I have assumed that an ultimate quantity of approximately 175 barrels of lager beer is to be made in accordance with my invention. For this amount of product I first proceed to soak about 5425 lbs. of prunes in water, for approximately 12 hours. The prunes are preferably relatively small, usually of size 100 to 120. Of course, larger prunes can just as well be utilized, but the smaller sizes are not otherwise so marketable and are eminently satisfactory for my purpose. During the soaking I stir the prunes from time to time in order that they may take up as much water as possible, and at the end of the twelve-hour period I drain the water from the prunes. The soaked prunes are then carefully sliced, care being taken that the pits are in no wise broken or crushed.

Following this, the sliced prunes in the form of a mash, together with the pits, are placed in a suitable container, such as a steam-heated kettle, in which the temperature of the mash is increased to 72° Réaumur. When this temperature is attained the heat is shut off and the contents of the kettle are permitted to stand for substantially half an hour in order to permit absolute equalization of temperature throughout the entire mass. The temperature is subsequently raised to 79° Réaumur at which the heat is again stopped and the mass permitted to stand for a further half hour period in order to secure equalization of temperature. Following this second equalization period, the mass is brought to a boil at 80° Réaumur for a period of 20 minutes, after which the heating is stopped and the contents of the container are permitted to settle. The liquid is then drained from the settled material into a copper kettle.

I next proceed to make a mash of 3000 lbs. of malt at a temperature of 33° Réaumur. When the temperature has attained this point the heat is cut off and the mash is permitted to stand for half an hour to equalize the temperature throughout. At the end of the rest period the temperature of the mash is raised to 54° Réaumur, after which there is a second rest period of approximately 20 minutes. Following this, the temperature is further increased to 59° Réaumur, and the mash is permitted to stand until it is settled. After settling there is strained from the mash liquid which is brought together with the prune liquid left in the copper kettle and referred to hereinabove. The mixture of the two liquids is of milky appearance. The mixture is brought to a boil and the boiling is continued until the theretofore milky liquid becomes clear and flaky solids are supernatant thereon.

At this juncture I add 88 lbs. of hops to the liquid, being sure that the hops are added slowly, and I permit the liquid to continue boiling for from two to three hours. At the end of this period an additional 44 lbs. of hops is added to the liquid and the boiling is continued for from 20 to 30 minutes after the hops are floating freely through the liquid.

At the end of this boiling operation the liquid is removed from the kettle and strained, and is cooled to room temperature or approximately 70° Fahrenheit and then flowed into a fermenting tank or vat. To the strained liquid in the fermenting vat I add one and two-tenths pounds of yeast for each 100 lbs. of liquid, and permit fermentation to proceed for from five to ten days. After the fermentation has proceeded for the stated period, the liquid is transferred into a settling tank and is permitted to remain therein for from two to three days or until such time as the solids settle. After such settling, the remaining liquid is pumped into resting tanks to remain for from eight to twelve weeks. On the way to the resting tanks the beer can be carbonated by the injection of carbonic acid gas, if desired, and particularly in the event the beer is to be bottled. When the beer has been properly rested for from eight to twelve weeks, it can be transferred to bottles or barrels. The product made in accordance with my method is of a clear, bland color, in appearance like best quality ordinary beer, and possesses a very palatable and appetizing taste.

I claim:

1. The method of making prune beer comprising making a prune liquor by boiling prunes in water, making a malt liquor by heating malt in water, combining said prune liquor with said malt liquor, boiling the combined liquors with added hops, cooling the combined liquors, and fermenting the combined liquors with added yeast.

2. The method of making prune beer comprising making a mash of the meat of water-soaked prunes, boiling the prune mash in water to make a prune liquor, making a malt liquor by heating malt in water, mixing and boiling the prune liquor and the malt liquor, adding hops to the boiling liquors, cooling the liquors, and causing fermentation of the cooled liquors by the addition of yeast thereto.

3. The method of making prune beer comprising making a mash of prunes in water, making a mash of malt in water, mixing the liquors from said mashes, adding hops to the mixed liquors, and fermenting the mixed liquors with added yeast.

4. The method of making prune beer comprising soaking prunes in water, comminuting the meat of said prunes, boiling said comminuted prunes, draining prune liquor from said boiled prunes, making a malt liquor by heating malt in water, mixing said prune liquor with said malt liquor, boiling said mixed liquors, adding hops to said boiling liquors, cooling said liquors, causing fermentation of the cooled liquors by the addition of yeast thereto, and settling the resultant fermented liquors.

EBERHARD A. KLEPPER.